INVENTOR.
LONNIE A. BURNETT

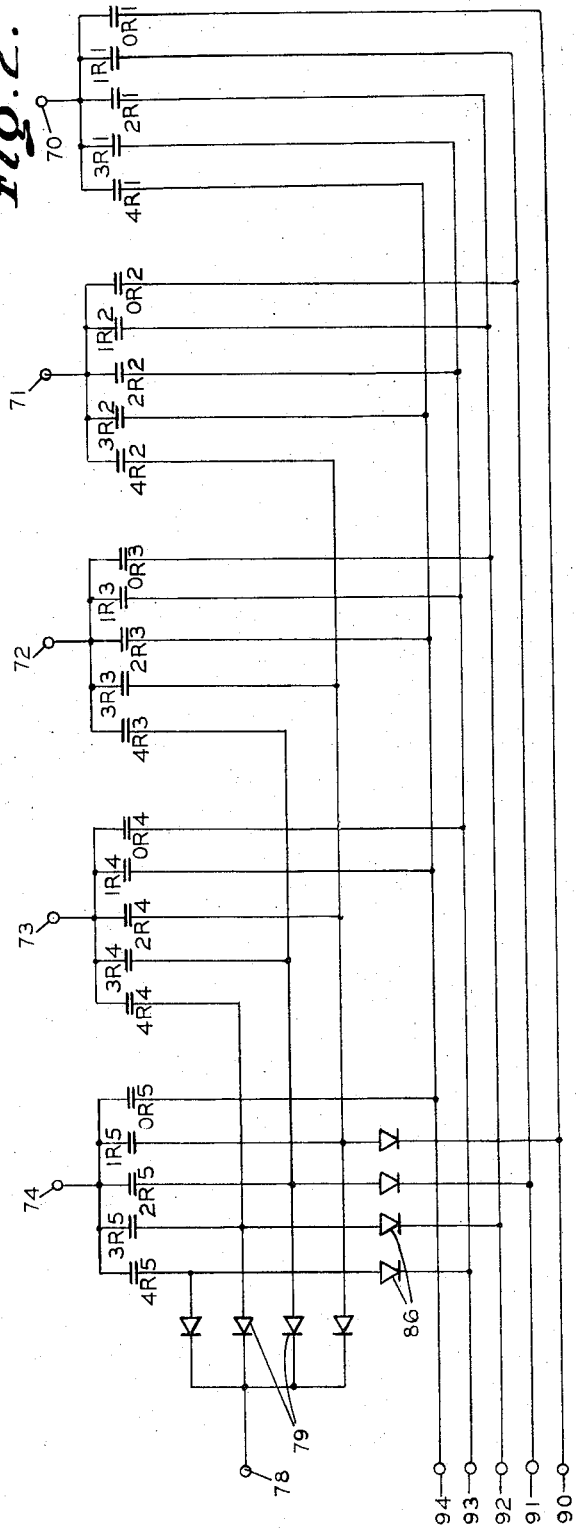
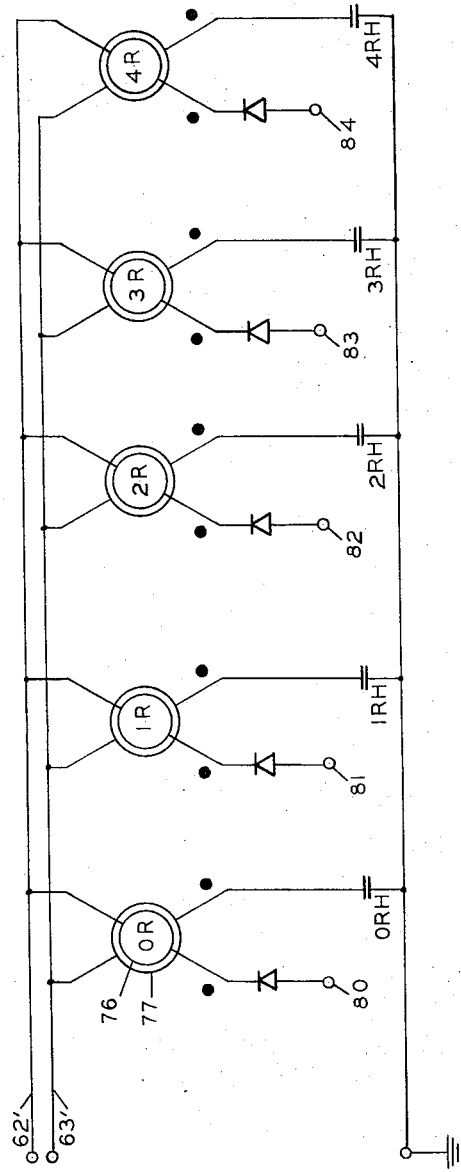
Fig. 3.
Fig. 2.

Dec. 20, 1966  L. A. BURNETT  3,293,423
QUINARY ADDER CARRY CIRCUIT
Filed Jan. 13, 1964  3 Sheets-Sheet 3
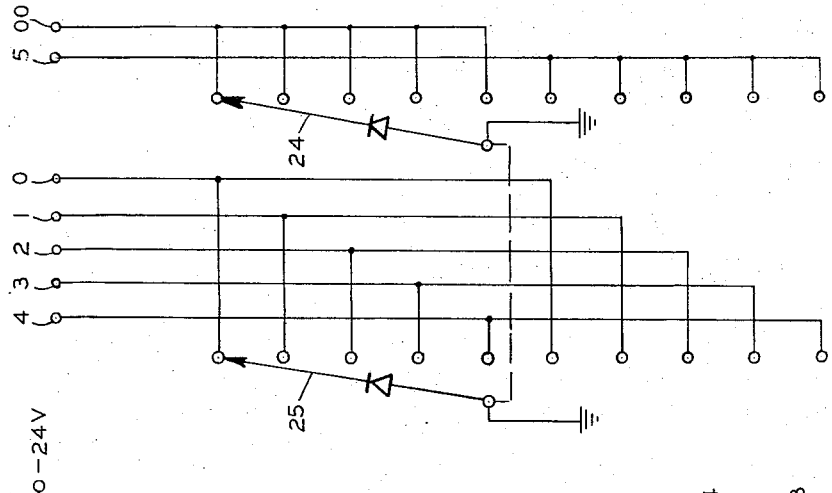
fig. 7.
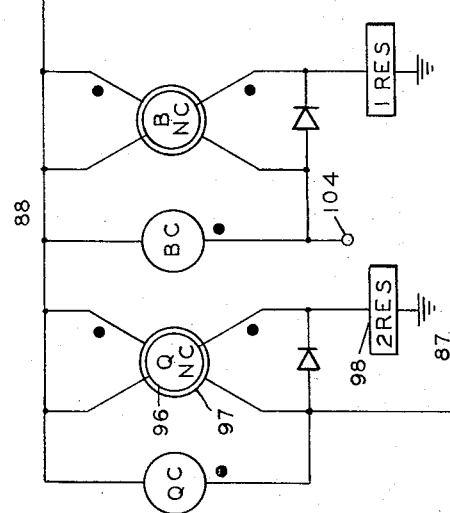
fig. 6.
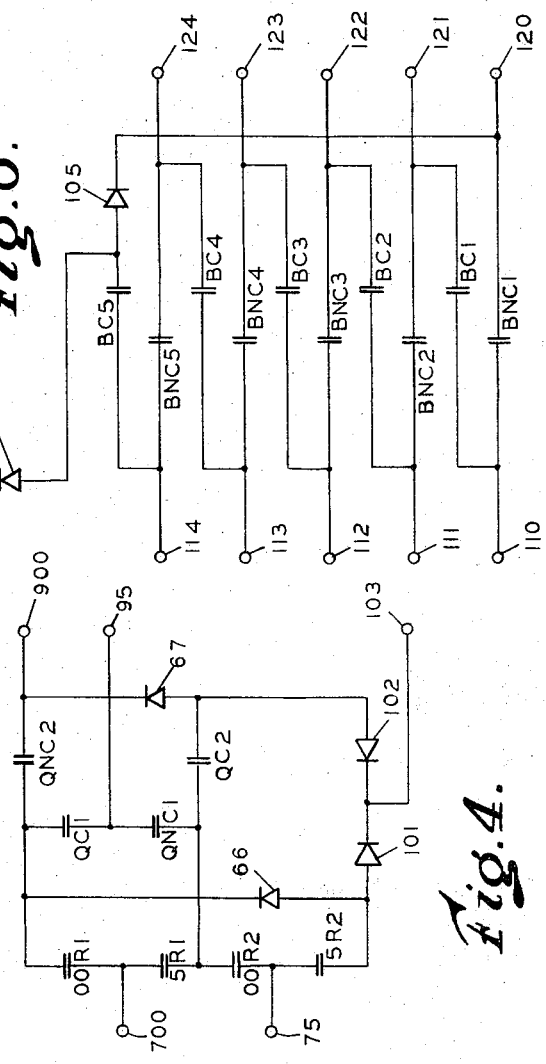
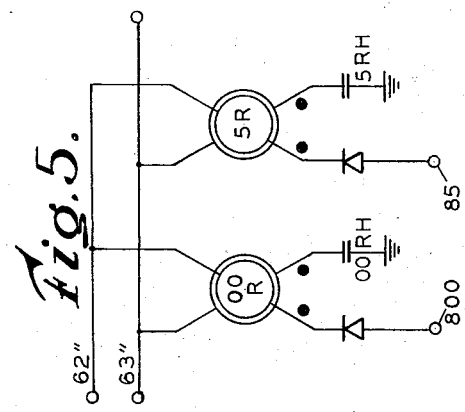
fig. 5.
fig. 4.

United States Patent Office 3,293,423
Patented Dec. 20, 1966

3,293,423
QUINARY ADDER CARRY CIRCUIT
Lonnie A. Burnett, Cincinnati, Ohio, assignor to The Cincinnati Milling Machine Co., Cincinnati, Ohio, a corporation of Ohio
Filed Jan. 13, 1964, Ser. No. 337,315
1 Claim. (Cl. 235—174)

This invention relates to automatic control apparatus for machine tools and more particularly to an adding circuit for producing an electrical output representing the sum of two numbers.

In the operation of machine tools such as automatic tool changing milling and boring machines and turret drilling machines, it is necessary accurately to control the depth of a hole to be drilled or a surface to be finished. In these machines, tools of varying types and lengths are employed for successive operations and these extend to different distances from the tool carrier which holds them while they are moved to the proper cutting depth in a workpiece. It is therefore necessary to provide an adding circuit for use in machine tool control which will sum hole depth, tool length and reference plane figures rapidly and accurately so that each tool will be accurately moved into the workpiece for producing the desired depth of cut in accordance with a prearranged program or schedule of operations.

It is therefore an object of this invention to provide a dependable adding circuit especially suited for use in combination with machine tools and their automatic control systems, the circuit being of rugged and durable design especially suited for the adverse environment of a machine shop.

It is a further object of this invention to provide an adding circuit in which reed switching devices can be used throughout to perform the adding operation.

Yet another object is to provide an adding circuit in which a minimum number of components are required to reduce the expense of fabrication.

It is also an object of this invention to provide an adding circuit which can be operated and maintained by personnel not having extensive technical electronic background.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form the present invention handles information representing decimal digits where the information is first converted into a biquinary code form. A biquinary code uses two of seven symbols to represent any one of the ten decimal symbols zero through nine. The seven symbols of the biquinary code comprise two number systems, one having a radix or base of two and the other a radix of five. In accordance with standard practice, the digits of the radix two system or binary code portion will be referred to herein as 00 and 5 while the radix five or quinary code portion digits will be referred to as 0 through 4. As an example, the decimal number 7 is identified in the biquinary code as 2 and 5, the quinary and binary digits, respectively. In adding two numbers in the present apparatus, the binary and quinary code portions are added in separate circuits. That is, a quinary adding circuit receives the two quinary code portions of the numbers and produces a quinary sum output and a carry signal when required. A binary adding circuit receives the two binary code portions and the quinary carry signal and produces a binary sum output plus a binary carry signal when appropriate. When decimal numbers of more than one digit are added, the biquinary representations of each decimal digit are handled separately with a binary carry from the lowest digit order binary adder circuit being connected as an additional input to the binary adder circuit of the next higher order digits. In this case the binary adder circuits corresponding to each digit order except that circuit for the lowest order also contains a matrix in which the quinary code portion sum from the respective quinary adder is summed with the binary carry signal from the next lower order digit circuit. In both of the adding circuits reed switches are used and operated by coils, each coil operating several normally open switching contacts simultaneously. The reed switches are included in a network between input and output counting terminals, the modulus of counting of the terminals in each adder corresponding to the radix of the code portions applied thereto. One of the code portion signals is applied to the corresponding input terminal and the same code portion signal of the other number is used to energize one of the reed switch coils corresponding thereto to connect the signal at the input terminal to one of the output terminals corresponding to the sum of the two code portions. A clear understanding of the invention can be obtained from the following detailed description in which reference is made to the attached drawings wherein:

FIG. 2 is a switching network included in each of the quinary adders of FIG. 1.

FIG. 3 is a schematic showing of the energizing coils for the switches in FIG. 2 and the coils are included in the quinary adders of FIG. 1.

FIG. 4 is a switching network included in each of the binary adders of FIG. 1.

FIG. 5 is a schematic showing of the energizing coils for the switches in FIG. 4.

FIG. 6 is a schematic circuit showing another switching network and the operating coils therefor to handle carry signals, this circuit also being included in each of the binary adders of FIG. 1.

FIG. 7 is a schematic showing of a switch for converting decimal number information into biquinary code information.

Figure 1:
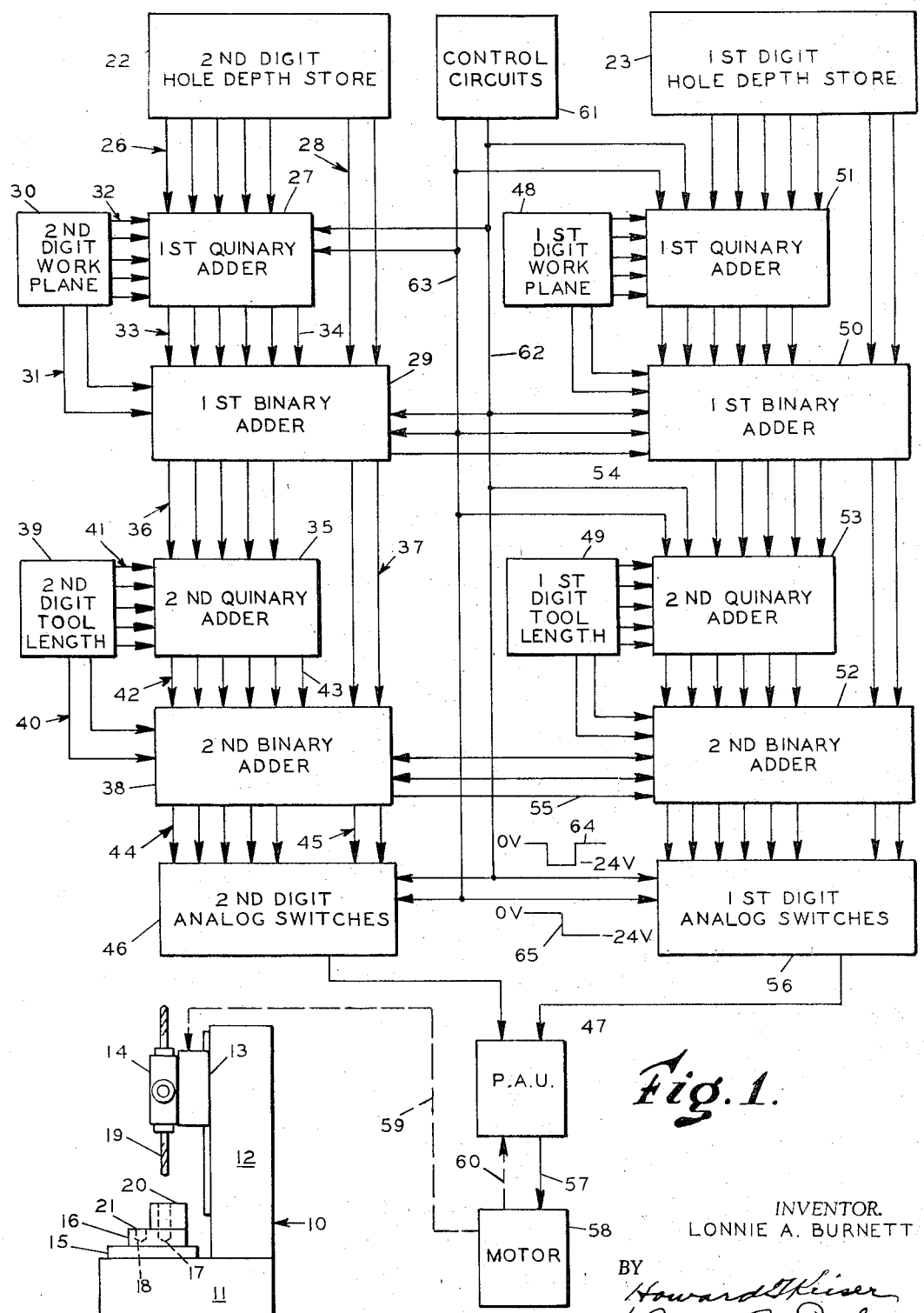
FIG. 1 is a block diagram showing the analog control system for the Z-axis or hole depth in a turret drilling machine.

The block diagram shown in FIG. 1 is adapted to control the Z-axis of a turret drilling machine 10 which is comprised of a base 11, a column 12, a spindle carrier 13 and a turret 14. The base 11 also supports a table 15 on which a workpiece 16 is positioned. The workpiece 16 is of varying thickness and holes 17, 18 are to be drilled therein. The holes 17, 18 are of a specific depth from the top surfaces of the workpiece. The control to be described herein, and including the adding circuit of this invention, is utilized to control movement of the spindle carrier 13 downward from the position shown toward the workpiece 16 such that a selected tool 19 in the turret 14 will produce the desired hole depth. In setup of the machine the distance from the tip of the tool 19 to the top or highest surface 20 of the workpiece 16 is measured and designated tool length. The desired depth of the hole 17 from the top surface 20 is another dimension utilized. In drilling the hole 18 with the same tool 19, the same tool length dimension can be used and the depth of the hole 18 from the surface 21 can be used, but an additional dimension equal to the difference between planes of the surfaces 20, 21 must be added such that the hole 18 is drilled to the desired depth. The dimension between the surfaces 20, 21 is designated as the work plane dimension for purposes of this description. Therefore, in causing the machine 10 to produce the hole 18, three dimensions must be furnished to the machine and these must be added together to form a single control dimension for which an analog signal is to be produced.

The block diagram of FIG. 1 is drawn to show a system in which a two digit decimal number can be furnished for each of the three dimensions, tool length, hole depth, and work plane. This is for purposes of illustration only and dimensions of any number of significant digits can be provided for by the teaching of this invention by adding similar circuits parallel to the circuits shown and described herein.

The first and second digits of the hole depth dimension are set up and converted to biquinary code representations in the circuits 22, 23. These circuits can be considered to be switches as shown in FIG. 7. The contacts 24, 25 which move in unison are manually set in one of ten positions corresponding to the decimal digits zero through nine. One of the terminals 00 or 5 will then be connected to ground potential by the contact 24, depending upon whether the contacts 24, 25 are in one of the first five positions or one of the second five positions and this furnishes the binary code signal portion corresponding to the decimal number represented by the position of the contacts 24, 25. The contact 25 will connect ground potential to one of the terminals 0–4 to identify the position within the two ranges of five positions identified by the binary signal and this furnishes the quinary code signal portion corresponding to the decimal digit. The circuits 22, 23 need not be switches as described but code conversion matrixes with inputs from a tape reader can be substituted therefor. The connection and use of such devices in combination with the circuits to be described are within the skill of the art and the switches as shown in FIG. 7 are sufficient to teach one skilled in the art to construct and use the adding circuit of this invention.

The code representation of the lower order digit is connected via two groups of conductors, one group 26 of five conductors connects the quinary code portion to the first quinary adder circuits 27 while the other group 28 connects the binary code portion to the first binary adder circuits 29. A second biquinary code signal is set up in the second digit store 30 for the work plane dimension. The store 30 can also be a switch such as described with reference to FIG. 7. The biquinary coded information from the store 30 is connected to the first binary and quinary adders 29, 27 by groups of conductors 31, 32 respectively. The quinary sum is applied by conductors 33 from the quinary adder 27 to the binary adder 29 and a conductor 34 included therewith connects a quinary carry signal to the binary adder 29. From there the quinary sum is furnished as an input to a second quinary adder 35 through conductors 36. The binary sum signal from the first binary adder 29 also is connected by conductors 37 as an input to a second binary adder 38. The second digit of the described tool length dimension, that is the distance from the tool 19 to the top surface 21 when the spindle carrier 13 is in its retracted position, is set up in a store 39. The store 39 also can be considered to be comprised of a biquinary switch as shown in FIG. 7. The code portions of the biquinary tool length dimension are connected to the second binary and quinary adders 38, 35 by groups of conductors 40, 41 respectively. The second quinary sum is connected to the second binary adder 37 by a group of conductors 42 which also includes a conductor 43 for a quinary carry signal. Both the quinary and binary sums are transmitted by conductors 44, 45 to a second digit analog switching circuit 46 where switches are operated in accordance therewith to set up an analog voltage representative of the sum of the second digits of the dimensions for hole depth, work plane and tool length. The circuit 46 can be of any type well known in the control industry in which selected switches are operated to connect sine and cosine voltages to field coils of an electrical resolver included in a position analog unit 47.

The first or higher order digits of the same dimensions are handled in the same way as the lower order digits. The hole depth digit is set up in the switching circuit 23, the work plane digit is set up in a switching circuit 48 and the tool length digit is set up in a switching circuit 49. Each of these furnishes biquinary coded numerical information which is used in a similar combination of first binary and quinary adding circuits 50, 51 and second binary and quinary adding circuits 52, 53. In addition, each of the first digit binary adders 29, 38 furnishes a binary carry signal to each of the binary adders 50, 52 through conductors 54, 55, respectively. A set of first digit analog switches 56 are operated in accordance with the sum of the first digits and the carry signals from the second digits and the analog voltages resulting therefrom are connected to field windings of another electrical resolver included in the position analog unit 47.

The position analog unit 47 supplies an electrical signal proportional to the difference between the desired and instantaneous positions of the carrier 13 and the difference signal is connected through electrical conducting means 57 to operate a Z-axis motor 58 which is mechanically connected as indicated by the broken line 59 to the spindle carrier 13 for movement thereof on the column 12. The motor 58 is also connected by a mechanical drive 60 to the rotors of the resolvers included in the position analog unit 47 in such a manner that the resolver rotors are rotated in a direction tending to reduce the output signal on the conductor 57 to a null voltage as is common in servo-mechanisms of this type.

The circuit of FIG. 1 also includes a control circuit unit 61 which operates to control the transfer of information from the dimension stores 22, 23, 30, 39, 48, 49 into the appropriate adder circuits. A pair of output conductors 62, 63 transmit pick-up and hold signals, respectively, to each of the described adder circuits. The information is initially transferred from the switches on the pick-up signal which is a —24 volt pulse as indicated at 64 and the hold signal is a —24 volt signal of extended duration beginning during the pick-up pulse as indicated by the wave shape 65. The manner in which the transfer of information is made by these signals is described in the following detailed descriptions of the quinary adder 27 and the binary adder 29.

The quinary adder 27 is comprised of the two circuits shown in FIGS. 2 and 3. The circuit of FIG. 2 shows a switching network by which the quinary input signal from one of the conductors 26 is transferred to one of the output counting terminals 90–94 to which the conductors 33 are connected. The quinary input signal is a ground potential connection through a switch as described in connection with FIG. 7. It is connected through one of the conductors 26 to a corresponding one of the input counting terminals 70–74. Both the input terminals 70–74 and the output terminals 90–94 are used in counting cyclicly through a modulus of five corresponding to the radix of the quinary code portion. Each of the five input terminals 70–74 is connected in a net work to a set of switches 0R1 to 4R1 through 0R5 to 4R5, respectively, which are all normally open and employ reed type contacts. The switches each having the same prefix are all operated in unison, that is, switches 0R1 through 0R5 are all closed simultaneously when any one therein is closed. It can be seen that each switch 0R1 through 0R5 when closed at the same time will connect the terminals 70–74 to the terminals 90–94, respectively. The switches 1R1 through 1R5 when closed will connect terminals 70–74 to the output terminals 91–94, 90, respectively. The switches 4R1 through 4R5 will connect the terminals 70–74 to the output terminals 94, 90–93, respectively, and so on. Therefore, as each commonly prefixed group of switches is operated to close and complete a circuit therethrough, each of the input terminals 70–74 is connected to one of the output terminals 90–94 but as each prefixed group is operated, each of the terminals 70–74 is connected to a different one of the output terminals 90–94.

The switches 0R1 to 0R4 through 4R1 to 4R5 are operated by the circuit shown in FIG. 3 which contains the relay windings 0R through 4R. Each of these windings is comprised of two coils 76, 77 which are of the same polarity as indicated and aid one another in holding the switches associated therewith closed when the coils are energized. Either one of the coils 76, 77 is sufficient to hold the switches closed however. The windings 0R through 4R, respectively, operate the relay switch groupings 0R1–0R4 through 4R1–4R5. Each of the windings 0R–4R will close its switches when there is a 24 volt potential impressed across one or both of its windings 76, 77. The lines 62' and 63' are connected to the lines 62, 63 and receive the pick-up and hold signals therefrom. These are at −24 volts. The terminals 80–84 are connected to the quinary conductors 32 in numerical order and when one of these is at ground potential, through the positioning of the contact 25 in a switch as in FIG. 7, simultaneously with the pick-up pulse on line 62', the coil 76 is energized and all of the reed contacts associated therewith are closed together. An additional hold switch 0RH–4RH is associated with each of the windings 0R–4R to hold the coils energized. When the pick-up pulse occurs and when the coil 76 of one of the windings 0R–4R is energized, its hold switch closes to connect ground potential to one side of its coil 77. Since the −24 volt hold signal begins before the pick-up pulse disappears, the coil 77 is then energized before the hold switch is opened and the switches remain closed for as long as the hold signal is present to maintain the winding energized.

The circuits described perform the addition in the quinary adder circuit 27 and exactly the same circuits are found in the other quinary adders 35, 51 and 53. The addition is best seen from an example. Assume that the input counting terminal 73 is connected to ground through the hole depth store circuit 22 and the input counting terminal 82 is connected to ground through the work plane store 30. The pick-up and hold signals have occurred and the hold signal persists. Therefore the relay winding 2R is energized and the switches 2R1–2R5 are closed. The ground signal at the terminal 73 is then transferred through the network of FIG. 2 to the output terminal 90, which represents the quinary digit 0 and is the sum of the two quinary digits 2 and 3. The sum represents one more than the quinary digits and therefore is indicated by the 0 output representing the sum in a second range or re-cycling of the five digits. To account for the first modulus of five through which the sum is counted and which is inherent in the resulting sum, a quinary carry signal is required. This carry signal is produced at the terminal 78 whenever the total in the circuit exceeds the modulus of five. The carry signal results at the terminal 78 through the diodes 79 which restrict signal passage to one direction only when there is a quinary input at one of the terminals 71–74 and when some of the switches 4R2, 3R3, 4R3, 2R4, 3R4, 4R5, 3R5, 2R5 and 1R5 are closed. Combinations of these terminals and switches can produce a sum representing a number in excess of that which can be symbolized by only one quinary digit alone and therefore a recycling of the modulo-five count is effected and a carry signal is produced to indicate the recycling. The diodes 86 prevent the passage of a signal from the output terminals 90–93 to the carry terminal 78 when the sum is not more than a quinary 4 and thereby prevent the creation of a false carry signal.

The detail of the binary adding circuit 29 is shown in FIGS. 4, 5 and 6. A pair of modulus two counting input terminals 700 and 75 are connected to the 00 and 5 terminals, respectively, of the switch in the hole depth store 22 by the conductors 28. A pair of modulus two output terminals 900 and 95 are connected selectively to the input terminals 700, 75 by the closing of selected of the reed switches 00R1, 00R2, 5R1, 5R2, QC1, QC2, QNC1 and QNC2 which are included, with the diodes 66, 67, in a network between those terminals. The switches prefixed 00 and 5 are operated respectively by relay windings 00R and 5R which are identical to the windings 0R through 4R of FIG. 3 and are energized in response to the pick-up and hold signals which are connected from the lines 62 and 63 to the lines 62″ and 63″, respectively. The switches QC1 and QC2 are operated by a winding QC in response to a quinary carry signal at the output terminal 78 of the quinary adder circuit 27 to which an input terminal 87 of the binary adder circuit 29 is connected by the conductor 34. The winding QC is a single coil, one end of which is connected directly to a −24 volt line 88 so that when the carry signal at ground potential is connected to the terminal 87, the coil is energized and the switches QC1 and QC2 are closed. When there is no quinary carry signal these switches are open. The switches QNC1 and QNC2 are operated by a relay winding QNC which is comprised of two coils 96, 97 one of which is constantly connected from ground to the −24 volt line 88 through a current limiting resistance 98. The other coil 97 is connected at one end to the line 88 but its other side is connected to the quinary carry input terminal 87. This other coil 97 is of opposing polarity to the coil 96 and produces an equal amount of flux. When there is no quinary carry signal connected to the terminal 87, the flux from the coil 96 holds the switches QNC1 and QNC2 closed but when the coil 97 is also energized, no net flux results in the winding and the switches open.

It can be seen when the input signal to FIG. 4 is a ground at terminal 700 and the winding 00R is energized during the time when no carry signal is connected to the terminal 87, the ground or binary 00 signal at the terminal 700 is connected directly to the output terminal 900 to represent the binary sum 00. If the terminal 75 is at ground and the winding 00R is energized, the output terminal 95 is connected to the input terminal 75 and the ground potential signal is transferred therefrom. Should the winding 5R be energized with the input terminal 700 at ground potential, the ground potential signal is transferred from the terminal 95. When there is an input signal at terminal 75 and the winding 5R is energized, the signal is transferred from the terminal 75 to the output terminal 900. In all of these situations, the transfer of the ground potential input signal on terminal 700 or 75 is in accordance with the sum of the binary symbols represented and is properly represented at the modulo-two output terminals 900 and 95. If the quinary carry signal is applied at the terminal 87, the switches QC1 and QC2 are closed and the switches QNC1 and QNC2 are opened. The above recited transferals of the signals from the input to output terminals are reversed as between the output terminals 900 and 95 to add the carry value of one binary unit to the binary sum representation.

At any time that the sum of the binary inputs exceeds the modulus two of the counting output terminals 900, 95, a binary carry signal is transmitted through one of a pair of diodes 101, 102 to a carry terminal 103. The terminal 103 of the binary adder 29 is connected by the conductor 54 to an input of the binary adder 50 which sums the next higher digits of the input numerical data. Each of the adders 29, 50 contains an additional pair of windings BC and BNC and an input terminal 104. Since the circuit 29 is in the lower order summing chain, no input is connected to the terminal 104 therein but the binary carry from the terminal 103 included in the circuit 29 supplies an input that is connected to the terminal 104 in the adder circuit 50. Therefore the windings BC and BNC therein are energized and deenergized in accordance with the binary carry signal from the adder circuit 29. The windings BC and BNC are identical with the windings QC and QNC and are operated in the same manner. Switches BC1–BC5 and BNC1–BNC5 are included in a network between a set of modulo-five input terminals 110–114 and a set of modulo-five output terminals 120–124. The output of the quinary adder in the first adding stage is connected as the input to the corresponding of the terminals 110–114. When there is no binary carry signal from the next lower order digit circuitry, the switches BNC1–BNC5 are closed and the transferral of the quinary input is made to the output terminals 120–124 without an alteration of the representation, that is, there is no addition of a carry. When a binary carry signal is present at the lower order digit circuitry, the quinary sum of the next higher order digit must be altered to add a quinary unit, the binary carry signal of the lower order digit representing one quinary unit of the next higher order digit representations. Therefore, when the relay winding BC is energized and the contacts BC1–BC5 are closed and the contacts BNC1–BNC5 are opened, the input on one of the terminals 110–114 is transferred to the one of the output terminals 120–124 representing the next higher quinary digit. Since the terminals 120–124 count in the modulus of five, the next higher representation from the terminal 124 is the terminal 120 and it can be seen that the transfer is made through the diode 105. When such a transfer is made, a quinary carry signal must be generated to operate the associated binary adding network. Therefore, a diode 106 is included in the circuit to pass a carry signal at the same time that the input at terminal 114 is transferred to the output 120 and this carry appears in the circuit of the windings QC and QNC just as if it were applied at the terminal 87 and the binary adding network is altered accordingly.

It can be seen from the detailed description that the sum of the two decimal numbers converted to biquinary code form from the summing circuits 27, 29 appears as a ground potential signal on one of the five final quinary output terminals 120–124 and on one of the two final output terminals 900, 95 plus a binary carry signal at the terminal 103 for transmission to the next higher order digit summing circuitry. The adders 35, 38, 50, 51, 52 and 53 operate in the same way as do the adders 27, 29 described. Since the binary adders 50, 52 are in the higher order digit chain and there is no higher order digit, there will be no binary carry transmitted therefrom. While the invention has been described in connection with one possible form or embodiment thereof, it is to be understood that the present disclosure is illustrative rather than restrictive and that changes and modifications may be resorted to without departing from the spirit of the invention or the scope of the claims which follow.

What is claimed is:

In an adding circuit for producing the quinary portion of a biquinary code sum of two numerical representations of the same order of value, the adding circuit having a set of five input terminals representing the quinary digital values of the numerical order and switching networks connected to each of the input terminals having five contacts each representing a quinary digital value of the numerical order, a carry signal generation system comprising in combination:

(a) a carry signal terminal,
(b) a first diode,
(c) means for connecting said first diode between said carry signal terminal and the highest quinary digital value contact of the switching network connected to the input terminal corresponding to the highest quinary digital value,
(d) a second diode,
(e) means for connecting said second diode between said carry signal terminal and the second highest and highest quinary digital value contacts, respectively, of the switching networks connected to the input terminals corresponding to the highest and second highest quinary digital values,
(f) a third diode,
(g) means for connecting said third diode between said carry signal terminal and the third highest, second highest and highest quinary digital value contacts, respectively, of the switching networks connected to the input terminals corresponding to the highest, second highest and third highest quinary digital values,
(h) a fourth diode,
(i) means for connecting said fourth diode between said carry signal terminal and the fourth highest, third highest, second highest and highest quinary digital value contacts, respectively, of the switching networks connected to the input terminals corresponding to the highest, second highest, third highest and fourth highest quinary digital values, said diodes all faced for conduction toward said output terminal,
(j) a set of five quinary output terminals, each terminal representing a quinary digital value in the order of value of the input terminals,
(k) contacts in each of the switching networks representing each quinary digital value,
(l) means for operating one contact in each of the switching networks to represent therein the value of one quinary digit,
(m) means to apply a predetermined potential to one of the input terminals to represent another quinary digital value to be summed with said one digit,
(n) means for connecting the contacts in each switching network to said output terminals, the order of connection of said contacts being cyclicly advanced one digit place from one switching network to the switching network connected to the next higher value digital input terminal whereby the predetermined potential is connected to one of said output terminals cyclicly advanced by a number of digital value positions corresponding to said one quinary digit to represent the sum of said one and other digits, and
(o) an additional set of four diodes, the diodes of the additional set being connected between said first, second, third and fourth diodes, respectively, and the second highest, third highest, fourth highest and lowest digit value output terminals and faced for conduction toward said output terminals to prevent false carry signals.

References Cited by the Examiner

UNITED STATES PATENTS

| | | | |
|---|---|---|---|
| 2,737,647 | 3/1956 | Oliwa | 340—345 |
| 2,932,451 | 4/1960 | Beattie et al. | 235—174 |
| 3,009,639 | 11/1961 | Hoppe | 235—174 |
| 3,015,445 | 1/1962 | Kashio | 235—174 |
| 3,047,231 | 7/1962 | Bonn et al. | 235—176 |

OTHER REFERENCES

Engineering Research Associates: High-Speed Computing Devices, McGraw-Hill, 1959, page 43.

Keister et al.: Design of Switching Circuits, Van Nostrand, 1951, pages 461–468.

R. K. Richards: Arithmetic Operations in Digital Computers; Van Nostrand, 1955, pages 32–33 and 226–227.

MALCOLM A. MORRISON, *Primary Examiner.*

K. F. MILDE, *Assistant Examiner.*